United States Patent [19]

Dickerson

[11] 4,405,148
[45] Sep. 20, 1983

[54] INSERT FOR VEHICLE TOW BAR

[76] Inventor: Eugene D. Dickerson, Rte. 1, Box 237, Sterrett, Ala. 35147

[21] Appl. No.: 284,547

[22] Filed: Jul. 20, 1981

[51] Int. Cl.³ .............................................. B60D 1/16
[52] U.S. Cl. ................................ 280/491 E; 280/495; 414/563
[58] Field of Search .................... 280/495, 402, 491 R, 280/491 B, 491 E, 493, 503; 414/563

[56] References Cited

U.S. PATENT DOCUMENTS 3,758,135  9/1973  Kniff ................................ 280/503 X
3,947,062  3/1976  Pierce .......................... 280/491 D X Primary Examiner—Joseph F. Peters, Jr.
Assistant Examiner—Mitchell J. Hill
Attorney, Agent, or Firm—Woodford R. Thompson, Jr.

[57] ABSTRACT

A tow bar insert for use with a conventional Volkswagen tow bar for towing a towed vehicle, such as a Volkswagen Super Beetle, embodies a U-shaped member adapted to fit within upstanding brackets at the end of the tow bar which is connected to the towed vehicle. A transverse load bearing member carried by each U-shaped member is positioned to engage an adjacent control arm extending laterally between the frame and each front wheel assembly of the towed vehicle. A retainer element detachably connects each U-shaped member to its upstanding bracket and limits movement of the U-shaped member relative to its control arm. A connector arm carried by one U-shaped member engages a sway bar connected to the control arms to center the tow bar underneath the front end of the towed vehicle.

7 Claims, 11 Drawing Figures

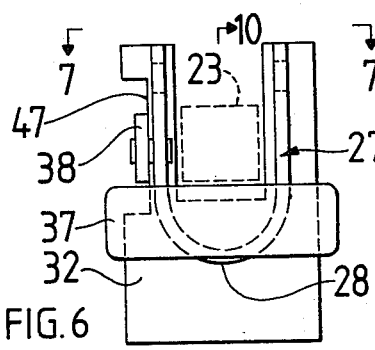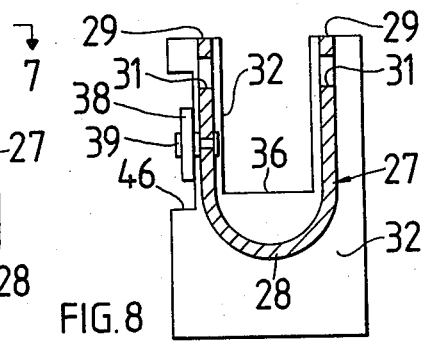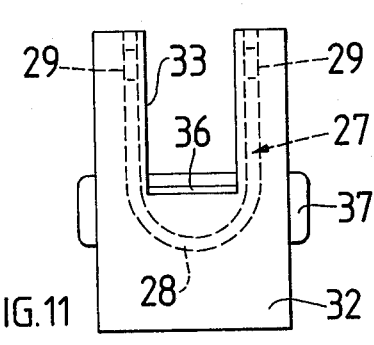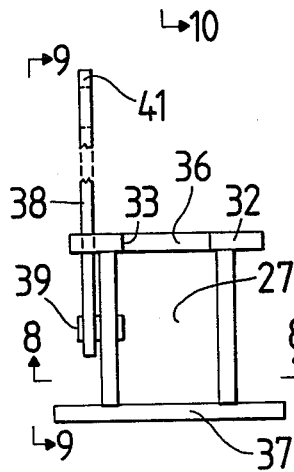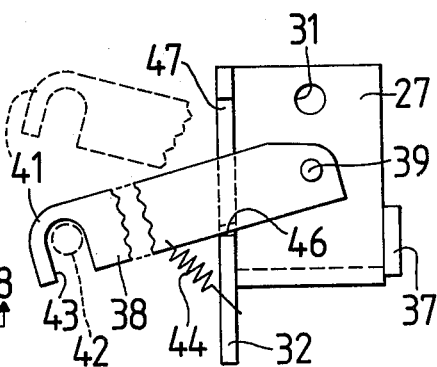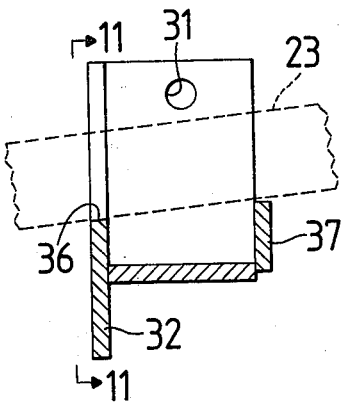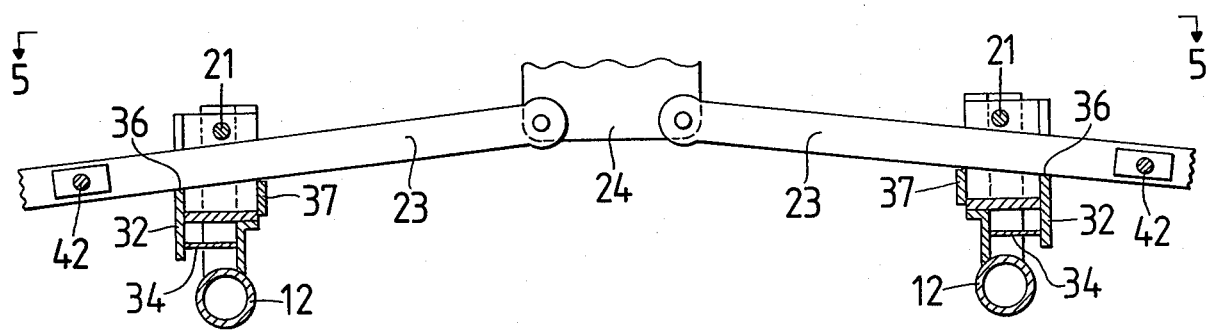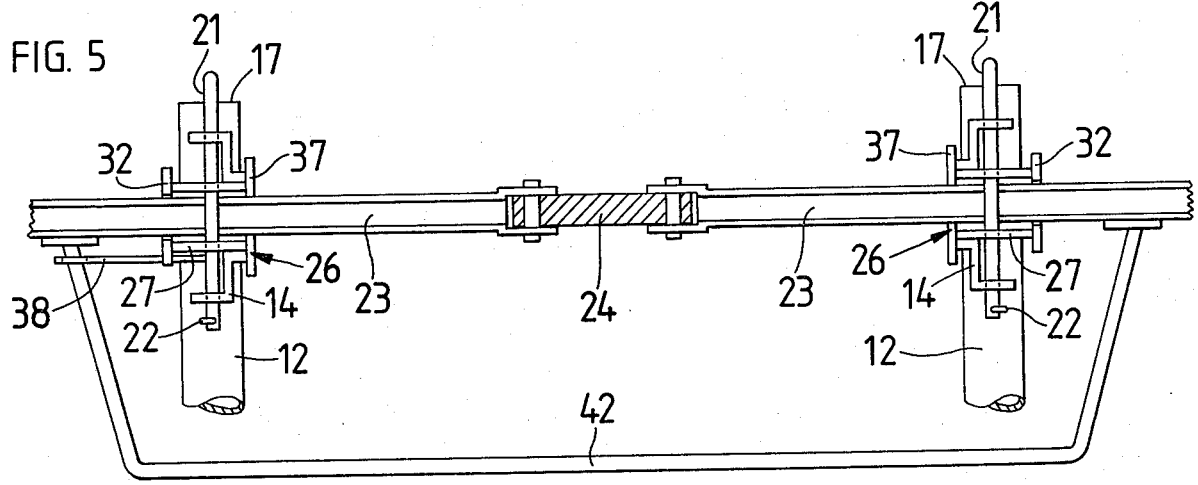

INSERT FOR VEHICLE TOW BAR

BACKGROUND OF THE INVENTION

This invention relates to an insert for a vehicle tow bar and more particularly to a tow bar insert adapted for use with a conventional Volkswagen tow bar in towing a vehicle, such as a Volkswagen Super Beetle, which does not have frame members in position for attaching the usual tow bar.

Heretofore in the art to which my invention relates various tow bars have been devised for towing Volkswagen Beetles and Dunebuggies. Conventional tow bars of this type with which I am familiar are disclosed in the following U.S. Pat. Nos. 3,501,169; 3,510,146; 3,664,687; 3,737,177; 3,758,135 and 3,768,837. Such tow bars are usually detachably connected to the front bumper and/or torsion bar assemblies which extend between the front wheels of the Beetle or Dunebuggy. The Volkswagen Super Beetle is not equipped with torsion bars but has the usual MacPherson type front suspension system. With this type system, pivotally mounted control arms extend laterally between the spindle assembly of each front wheel and a centrally disposed frame member. Difficulties have been encountered when conventional Volkswagen tow bars are used to tow Super Beetles due to the fact that such tow bars do not positively grip the Super Bettle's control arms. Accordingly, the Super Beetle will bounce or sway from side to side during the towing operation, thus resulting in unsafe conditions and possible damage to the towed vehicle.

SUMMARY OF THE INVENTION

In accordance with my invention, I overcome the above and other difficulties by providing tow bar inserts which may be used with a conventional Volkswagen tow bar to tow a Volkswagen Super Beetle in a safe manner. My tow bar inserts are simple of construction, economical of manufacture and may be quickly and easily installed and removed from the control arms of a Super Beetle by unskilled personnel and without the use of special tools. When assembled with a conventional Volkswagen tow bar, my improved inserts positively grip a Super Beetle's control arms whereby bouncing and swaying of the vehicle while being towed is greatly reduced.

My improved tow bar insert includes a generally U-shaped member which is adapted to fit within and engage an upwardly opening recess in each upstanding bracket carried by the end of the usual tow bar which is attached to the Super Beetle. A transverse load bearing member is carried by each U-shaped member in position to engage and support an adjacent control arm of the Super Beetle extending through the U-shaped member. A retainer element detachably connects each U-shaped member to its upstanding bracket and limits movement of the U-shaped member relative to the control arm extending therethrough.

BRIEF DESCRIPTION OF THE DRAWINGS

Apparatus ebodying features of my invention is illustrated in the accompanying drawings forming a part of this application in which:

FIG. 4 is an elevational view, partly in section, showing mu tow bar inserts detachably connected to the control arms of a vehicle of the Super Beetle type;

FIG. 5 is a top plan view partly in section taken generally along the line 5—5 of FIG. 4;

FIG. 6 is an enlarged end view of my tow bar insert, showing the control arm in dotted lines;

FIG. 7 is a top plan view taken generally along the line 7—7 of FIG. 6;

FIG. 8 is a sectional view taken generally along the line 8—8 of FIG. 7;

FIG. 9 is a side elevational view taken generally along the line 9—9 of FIG. 7;

FIG. 10 is a sectional view taken generally along the line 10—10 of FIG. 6 showing the control arm in dotted lines; and, FIG. 11 is an end elevational view taken generally along the line 11-11 of FIG. 10

DETAILED DESCRIPTION

Figure 1:
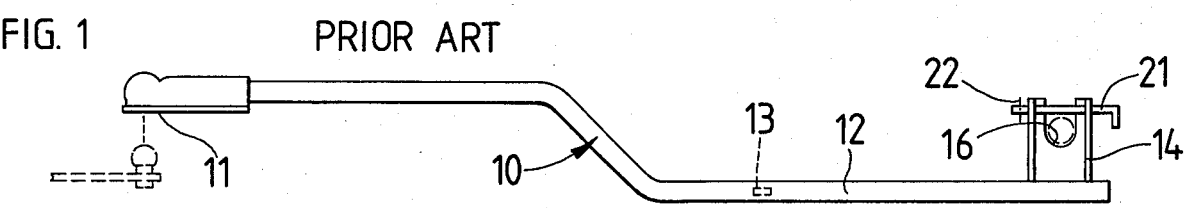
FIG. 1 is a side elevational view showing a conventional Volkswagen tow bar having a trailer hitch at one end and a bifurcated member carrying the usual upstanding brackets at the other end.
Figure 2:
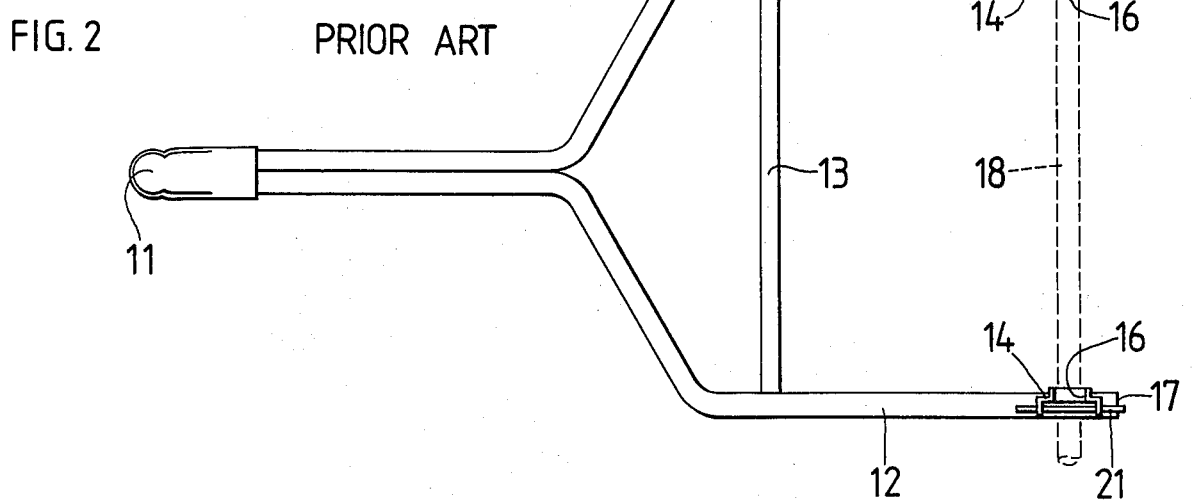
FIG. 2 is a top plan view of the tow bar shown in FIG. 1.
Figure 3:
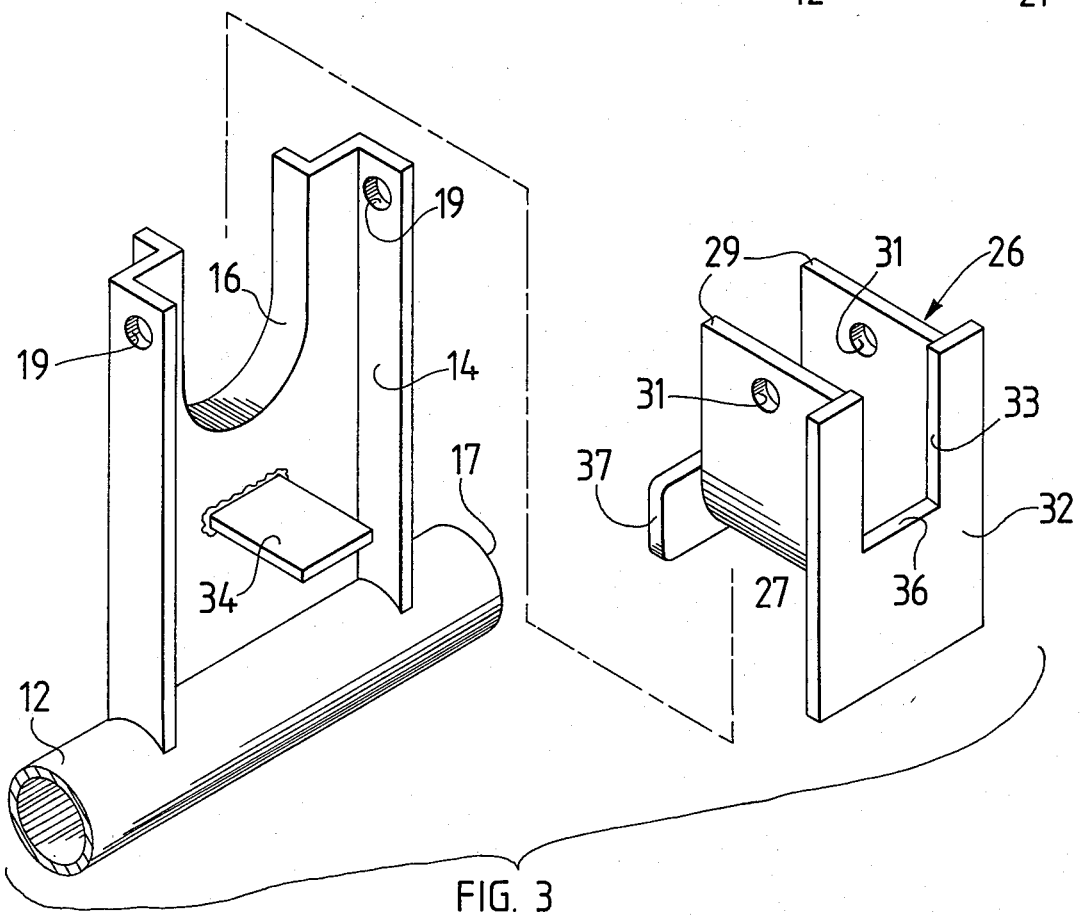
FIG. 3 is an enlarged perspective view showing my improved tow bar insert and the manner in which it is inserted in its upstanding bracket.

Referring now to the drawings for a better understanding of my invention, I show in FIGS. 1 and 2 a conventional tow bar 10 adapted for towing a vehicle, such as a Volkswagen Beetle or Dunebuggy. The tow bar 10 includes a conventional trailer hitch 11 at the forward end for attaching to a towing vehicle and a bifurcated member having spaced apart rearwardly extending arms 12. The usual bracing member 113 extends between the arms 12, as shown. An upstanding bracket 14 having an upwardly opening U-shaped recess 16 therein is carried by a rear end portion 17 of each rearwardly extending arm 12. The U-shaped recesses 16 are adapted to slip over and engage the usual cylindrical axle-like member 18, as shown in dotted lines in FIG. 2. The axle-like member 18 is part of the conventional front suspension system of a Volkswagen Beetle or Dunebuggy and extends horizontally between the spindle assemblies which carry the front wheels of these vehicles. Aligned openings 19 in each upstanding bracket 14 receive a retainer element, such as a removable pin-like member 21, which limits vertical movement of the axle-like member 18 relative to the U-shaped recesses 16. The usual spring clip 22 detachably connected to each pin-like member 21 locks the pin-like members within their upstanding brackts 14, as shown.

In FIGS. 4 and 5, I show the conventional MacPherson type front end suspension system of a vehicle, such as a Volkswagen Super Beetle. This system includes laterally and outwardly extending control arms 23 pivotally connected at their inner ends to the frame 24 of the Super Beetle and at their outer ends to the spindle assemblies, not shown, which carry the front wheels of the vehicle. Since the Super Beetle's control arms 23 are smaller in cross sectional area than the axle-like member 18, they would not fit within the upstanding brackets 14 of a conventional Volkswagen tow bar 10 in a manner required for safe towing of a Super Beetle.

My improved tow bar inserts 26 are adapted for assembly within the upstanding brackets 14 of the tow bar 10, as shown. The inserts 26, when attached to the Super Beetle's control arms 23, positively grip the control arms in the required manner for safe towing of the vehicle. Each insert 26 includes a generally U-shaped member 27 which is adapted to fit within and engage an adjacent U-shaped recess 16 carried by the bracket 14. Each U-shaped member 27 includes a base portion 28 connected to spaced apart legs 29. Aligned openings 31 are provided in the legs 29, as shown.

A transverse load bearing member 12, which may be in the form of a plate-like member having an upwardly opening recess 33 therein, is carried by each U-shaped member 27 in a position to engage and support an adjacent control arm 23 of the Super Beetle. As shown in FIGS. 4 and 5, each load bearing member 32 extends across and is connected to the outermost edges of the spaced apart legs 29 which face the Super Beetle's front wheel assemblies, not shown.

The load bearing members 32 also extends downwardly and engage laterally extending projections 34 carried by the upstanding brackets 14 of the tow bar 10. The projections 34 aid in holding the inserts 26 upright when inserted in their respective brackets 14. The edge 36 of the base of each recess 33 engages the bottom surface of its control arm 23 and is beveled downwardly and outwardly as shown in FIGS. 10 and 11 wherein the slope of the edge 36 corresponds to the inclination of its control arm 23, which is approximately 7°. The beveled edge 36 thus provides a wide load bearing contact surface between each U-shaped member 27 and its control arm 23.

A transverse element 34, which may be in the form of a bar-like member, is carried by the base portion 28 of each U-shaped member 27 at the opposite side thereof from the loading bearing member 32. The transverse element 37 engages the upstanding bracket 14 adjacent thereto and limits movement of the insert 26 relative to its bracket 14.

A connector arm 38 is carried by at least one of the U-shaped members 27 for centering the tow bar 10 underneath the front end of the Supper Beetle. One end of the connector arm 38 is pivotally connected as at 39 to the U-shaped member 27, as shown in FIG. 9. The other end 41 of the connector arm 38 extends toward and engages an adjacent portion of a conventional sway bar 42 connected to the control arm 23, as shown in FIG. 5. The connector arm 38 is disposed for vertical pivotal movement selectively to a lower connected position in engagement with the sway bar 42 and to an upper disconnected position out of engagement with the sway bar, as shown in dotted lines in FIG. 9. A downwardly opening recess 43 in the end 41 of the connector arm 38 engages the sway bar 42 when the connector arm 38 is in the connected position.

A resilient member, such as a tension spring 44, is interposed between the connector arm 38 and the U-shaped member 27, and urges the connector arm 38 downwardly toward its connected position. A stop member 46, in which may be defined by a laterally extending shoulder at the lower end of a recess 47 in the transverse load bearing member 32, limits downward vertical movement of the control arm 38. It will be apparent that the stop member 46 may be in other forms or shapes to limit vertical movement of the connector arm 38.

From the foregoing description, the operation of my improved tow bar inserts 26 used in combination with a conventional Volkswagen tow bar 10 will be readily understood. With the pin-like members 21 removed from the upstanding brackets 14, my tow bar inserts 26 are inserted in the U-shaped recesses 16 in the brackets 14. The lower end portions of the load bearing members 32 and the transverse elements 37 engage the projections 34 and the upstanding brackets 14, respectively, to hold the inserts 26 upright and in position to engage the control arms 23 of a vehicle, such as a Super Beetle Volkswagen. The openings 31 in the spaced apart legs 29 of each U-shaped member 27 are now aligned with the openings 19 in the brackets 14. The two bar 10 carrying the inserts 26 is then moved underneath the front end of the towed vehicle in position for the U-shaped members 27 to engage the control arms 23. The pin-like members 21 are then inserted through the aligned openings 19 and 31 to detachably connect each insert 26 to its bracket 14 and limit movement of each U-shaped member 27 relative to its control arm 23. The tow bar 10 is centered underneath the front end of the towed vehicle by detachably connecting the connector arm 38 to the sway bar 42 connected to the control arms 23 in the manner described above.

From the foregoing, it will be seen that I have devised an improved tow bar insert for use with conventional Volkswagen tow bars which positively grips the control arm of the towed vehicle in a manner which provides for safe towing of the towed vehicle. Also, my improved tow bar inserts are simple of construction, economical of manufacture and may be quickly and easily installed and removed from control arms of a towed vehicle, such as a Super Beetle Volkswagen.

While I have shown my invention in but one form, it will be obvious to those skilled in the art that it is not so limited, but is susceptible of various changes and modifications without departing from the spirit thereof.

What I claim is:

1. In a tow bar insert for use with a tow bar having connector means at the forward end thereof adapted for connection to a towing vehicle and a bifurcated member having rearwardly extending arms carrying upstanding brackets at the rear ends thereof, with an upwardly opening recess in each said bracket in position to receive an adjacent portion of a laterally and outwardly extending control arm pivotally connected at its inner end to the frame of a towed vehicle and pivotally connected at its outer end to the spindle assembly of an adjacent front wheel of said towed vehicle,
    (a) a generally U-shaped member adapted to fit within and engage each said upwardly opening recess in said upstanding brackets with each said U-shaped member having a base portion connected to spaced apart legs,
    (b) a transverse load bearing member carried by each said U-shaped member in position to engage and support an adjacent control arm of said towed vehicle while it extends through said U-shaped member,
    (c) detachable means connecting each said U-shaped member to is upstanding bracket and adapted to limit movement of said U-shaped member relative to its control arm,
    (d) a connector arm pivotally connected at one end to said U-shaped member with the other end thereof extending toward an adjacent portion of a sway bar connecting said control arms, with said connector arm being movable selectively to a connected position in engagement with said sway bar and to a disconnected position out of engagement with said sway bar, (e) resilient means between said connector arm and said U-shaped member urging said connector arm toward said connected position, and (f) at least one stop member carried by said U-shaped member limiting vertical movement of said connector arm.

2. A tow bar insert as defined in claim 1 in which a downwardly opening recess in said other end of said connector arm detachably connects said connector arm to said sway bar while said connector arm is in said connected position.

3. A tow bar insert as defined in claim 1 in which said resilient means is a tension spring.

4. In a tow bar insert for use with a tow bar having connector means at the forward end thereof adapted for connection to a towing vehicle and a bifurcated member having rearwardly extending arms carrying upstanding brackets at the rear ends thereof, with an upwardly opening recess in each said bracket in position to receive an adjacent portion of a laterally and outwardly extending control arm pivotally connected at its inner end to the frame of a towed vehicle and pivotally connected at its outer end to the spinle assembly of an adjacent front wheel of said towed vehicle, (a) a generally U-shaped member adapted to fit within and engage each said upwardly opening recess in said upstanding brackets with each said U-shaped member having a base portion connected to spaced apart legs, (b) a transverse load bearing member extending across and connected to said spaced apart legs of each said U-shaped member with the upper edge of said load bearing member engaging and supporting an adjacent control arm of said towed vehicle while it extends through said U-shaped member, and (c) detachable means connecting each said U-shaped member to its upstanding bracket and adapted to limit movement of said U-shaped member relative to its control arm.

5. A tow bar insert as defined in claim 4 in which said upper edge of said load bearing member is beveled downwardly and outwardly.

6. A tow bar insert as defined in claim 4 in which a transverse element is carried by the base portion of each said U-shaped member at the opposite side thereof from said load bearing member in position to engage said upstanding bracket adjacent thereto and limit movement of said U-shaped member relative to said upstanding bracket.

7. A tow bar insert as defined in claim 4 in which each said load bearing member extends downwardly in position to engage a laterally extending projection carried by each said upstanding bracket of said tow bar.

* * * * *